(12) United States Patent
Suyama et al.

(10) Patent No.: US 9,005,059 B2
(45) Date of Patent: Apr. 14, 2015

(54) REAR DERAILLEUR

(71) Applicant: Shimano Inc., Sakai, Osaka (JP)

(72) Inventors: Shota Suyama, Osaka (JP); Sota Yamaguchi, Osaka (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 98 days.

(21) Appl. No.: 13/851,385

(22) Filed: Mar. 27, 2013

(65) Prior Publication Data

US 2014/0296009 A1 Oct. 2, 2014

(51) Int. Cl.
| | |
|---|---|
| F16H 9/00 | (2006.01) |
| F16H 59/00 | (2006.01) |
| F16H 61/00 | (2006.01) |
| F16H 63/00 | (2006.01) |
| B62M 9/122 | (2010.01) |

(52) U.S. Cl.
CPC .................................... B62M 9/122 (2013.01)

(58) Field of Classification Search
CPC .. B62M 9/1242; B62M 9/126; B62M 9/1248; B62M 9/1342; B62M 9/127
USPC ...................................................... 474/80, 82
See application file for complete search history.

(56) References Cited

U.S. PATENT DOCUMENTS

| | | | | |
|---|---|---|---|---|
| 3,919,891 A | * | 11/1975 | Stuhlmuller et al. | 474/70 |
| 4,946,425 A | * | 8/1990 | Buhlmann | 474/80 |
| 5,254,044 A | * | 10/1993 | Anderson | 474/70 |
| 5,480,356 A | * | 1/1996 | Campagnolo | 474/70 |
| 5,494,307 A | * | 2/1996 | Anderson | 280/236 |
| 6,162,140 A | * | 12/2000 | Fukuda | 474/70 |
| 6,623,389 B1 | * | 9/2003 | Campagnolo | 474/70 |
| 6,676,549 B1 | * | 1/2004 | Fukuda | 474/102 |
| 6,761,655 B2 | * | 7/2004 | Fukuda | 474/70 |
| 6,945,888 B2 | * | 9/2005 | Fukuda et al. | 474/70 |
| 6,997,835 B2 | * | 2/2006 | Fukuda | 474/82 |
| 7,004,862 B2 | * | 2/2006 | Fukuda | 474/102 |
| 7,048,659 B2 | * | 5/2006 | Campagnolo | 474/70 |
| 7,255,660 B2 | * | 8/2007 | Del Pra | 474/82 |
| 7,381,142 B2 | * | 6/2008 | Campagnolo | 474/70 |
| 7,467,567 B2 | * | 12/2008 | Fukuda | 74/412 R |
| 7,563,186 B2 | * | 7/2009 | Mercat et al. | 474/78 |
| RE41,782 E | * | 9/2010 | Fukuda | 474/82 |
| 7,892,122 B2 | * | 2/2011 | Fukuda | 474/82 |
| 7,942,768 B2 | * | 5/2011 | Takamoto et al. | 474/82 |
| 7,980,974 B2 | * | 7/2011 | Fukuda | 474/70 |
| 8,277,346 B2 | * | 10/2012 | Watarai et al. | 474/82 |
| 2003/0207732 A1 | * | 11/2003 | Fukuda | 474/80 |
| 2004/0014541 A1 | * | 1/2004 | Dal Pra | 474/70 |
| 2004/0063528 A1 | * | 4/2004 | Campagnolo | 474/70 |

(Continued)

*Primary Examiner* — Henry Liu
(74) *Attorney, Agent, or Firm* — Global IP Counselors

(57) ABSTRACT

A rear derailleur includes a base member, a movable member, a linkage and an electric motor unit. The base member includes a bicycle mounting portion for attaching to a bicycle. The movable member includes a chain guide having a first pulley that rotates around a first pulley axis in a center pulley plane that bisects the first pulley. The linkage movably supports the movable member relative to the base member. The electric motor unit is stationary with respect to at least a part of the base member and operatively coupled to the linkage to move the movable member relative to the base member between an outermost lateral position and an innermost lateral position. The electric motor unit is at least partially disposed inward of the center pulley plane while the movable member is disposed in the outermost lateral position.

13 Claims, 9 Drawing Sheets

(56) References Cited

U.S. PATENT DOCUMENTS

| | | | |
|---|---|---|---|
| 2004/0102269 A1* | 5/2004 | Fukuda et al. | 474/82 |
| 2004/0102270 A1* | 5/2004 | Fukuda | 474/82 |
| 2005/0187048 A1* | 8/2005 | Fukuda | 474/70 |
| 2005/0187050 A1* | 8/2005 | Fukuda | 474/80 |
| 2005/0215369 A1* | 9/2005 | Fukuda et al. | 474/82 |
| 2006/0116227 A1* | 6/2006 | Mercat et al. | 474/82 |
| 2006/0183584 A1* | 8/2006 | Fukuda | 474/70 |
| 2006/0199688 A1* | 9/2006 | Dal Pra | 474/70 |
| 2006/0211528 A1* | 9/2006 | Campagnolo | 474/70 |
| 2007/0191159 A1* | 8/2007 | Fukuda | 474/82 |
| 2008/0227572 A1* | 9/2008 | Sakaue | 474/82 |
| 2009/0098963 A1* | 4/2009 | Watarai et al. | 474/80 |
| 2009/0215561 A1* | 8/2009 | Fukuda | 474/82 |
| 2012/0322591 A1* | 12/2012 | Kitamura et al. | 474/80 |

* cited by examiner

REAR DERAILLEUR

BACKGROUND

1. Field of the Invention

This invention generally relates to a rear derailleur for a bicycle. More specifically, the present invention relates to a rear derailleur having a linkage moved by a motor unit.

2. Background Information

A bicycle typically uses a chain drive transmission for transmitting a pedaling force to a rear wheel. The chain drive transmission of a bicycle often uses derailleurs to selectively move a chain from one of a plurality of sprockets to another for changing speeds of the bicycle. A typical derailleur has a base member, a movable member supporting a chain guide and a linkage assembly (e.g., a moving mechanism) coupled between the base member and the movable member so that the chain guide moves laterally relative to the base member. Recently, derailleurs have been equipped with electric motor units to make shifting gears easier.

SUMMARY

Generally, the present disclosure discloses various features of a rear derailleur for a bicycle. In one feature, a bicycle rear derailleur is provided that includes a linkage and an electric motor unit that minimizes the amount that the derailleur protrudes outwardly from a bicycle frame.

In view of the state of the known technology and in accordance with one aspect of the present invention, a rear derailleur provided that basically comprises a base member, a movable member, a linkage and an electric motor unit. The base member includes a bicycle mounting portion for attaching to a bicycle. The movable member includes a chain guide having a first pulley that rotates around a first pulley axis in a center pulley plane that bisects the first pulley. The linkage movably supports the movable member relative to the base member. The electric motor unit is stationary with respect to at least a part of the base member and operatively coupled to the linkage to move the movable member relative to the base member between an outermost lateral position and an innermost lateral position. The electric motor unit is at least partially disposed inward of the center pulley plane while the movable member is disposed in the outermost lateral position.

In accordance with a second aspect of the present invention, the rear derailleur according to the first aspect is configured so that the linkage is at least partially disposed inward of the center pulley plane while the movable member is disposed in the outermost lateral position.

In accordance with a third aspect of the present invention, the rear derailleur according to the first aspect is configured so that the electric motor unit includes an output shaft that is at least partially disposed inward of the center pulley plane while the movable member is disposed in the outermost lateral position.

In accordance with a fourth aspect of the present invention, the rear derailleur according to the third aspect is configured so that the linkage includes an inner link pivotally connected to the base member and the movable member, the output shaft being connected to the inner link.

In accordance with a fifth aspect of the present invention, the rear derailleur according to the first aspect is configured so that the electric motor unit includes an electric wire receptor that is at least partially disposed inward of the center pulley plane while the movable member is disposed in the outermost lateral position.

In accordance with a sixth aspect of the present invention, the rear derailleur according to the first aspect is configured so that the electric motor unit includes a motor unit mounting bracket that is at least partially disposed inward of the center pulley plane while the movable member is disposed in the outermost lateral position.

In accordance with a seventh aspect of the present invention, the rear derailleur according to the sixth aspect is configured so that the mounting bracket is coupled to the base member.

In accordance with an eighth aspect of the present invention, the rear derailleur according to the first aspect is configured so that the electric motor unit includes a motor that is at least partially disposed inward of the center pulley plane while the movable member is disposed in the outermost lateral position.

In accordance with a ninth aspect of the present invention, the rear derailleur according to the first aspect is configured so that the linkage includes a saver structure that is at least partially disposed inward of the center pulley plane while the movable member is disposed in the outermost lateral position.

In accordance with a tenth aspect of the present invention, the rear derailleur according to the ninth aspect is configured so that the linkage includes a first link pivotally connected to the base member and the movable member, and the saver structure is movably arranged between a drive transmitting position that connects a drive force of the motor unit to the first link and a non-drive transmitting position that disconnect the drive force of the motor unit from the first link.

In accordance with an eleventh aspect of the present invention, the rear derailleur according to the first aspect is configured so that the base member includes a first member and a second member coupled to the first member, the first member includes the bicycle mounting portion, and the second member includes a linkage supporting portion which is coupled to the linkage.

In accordance with a twelfth aspect of the present invention, the rear derailleur according to the eleventh aspect is configured so that the first member and the second member are pivotally coupled together.

In accordance with a thirteenth aspect of the present invention, the rear derailleur according to the first aspect is configured so that the motor unit is accommodated by the base member.

Other objects, features, aspects and advantages of the disclosed rear derailleur will become apparent to those skilled in the art from the following detailed description, which, taken in conjunction with the annexed drawings, discloses one embodiment of the rear derailleur.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
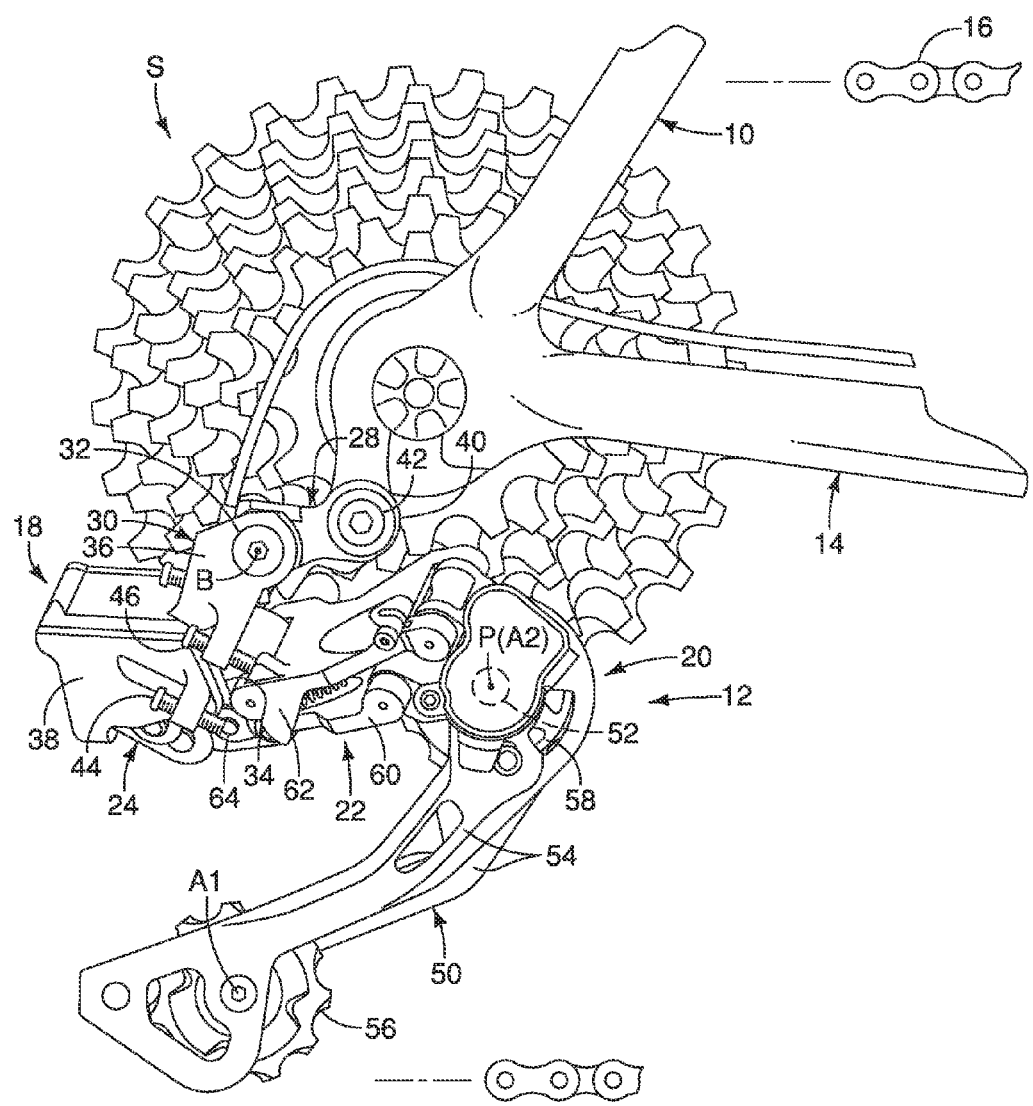
FIG. 1 is a partial side elevational view of a rear frame portion of a bicycle with a bicycle rear derailleur in a top shift stage position with the chain guide in a chain engagement position.
Figure 2:
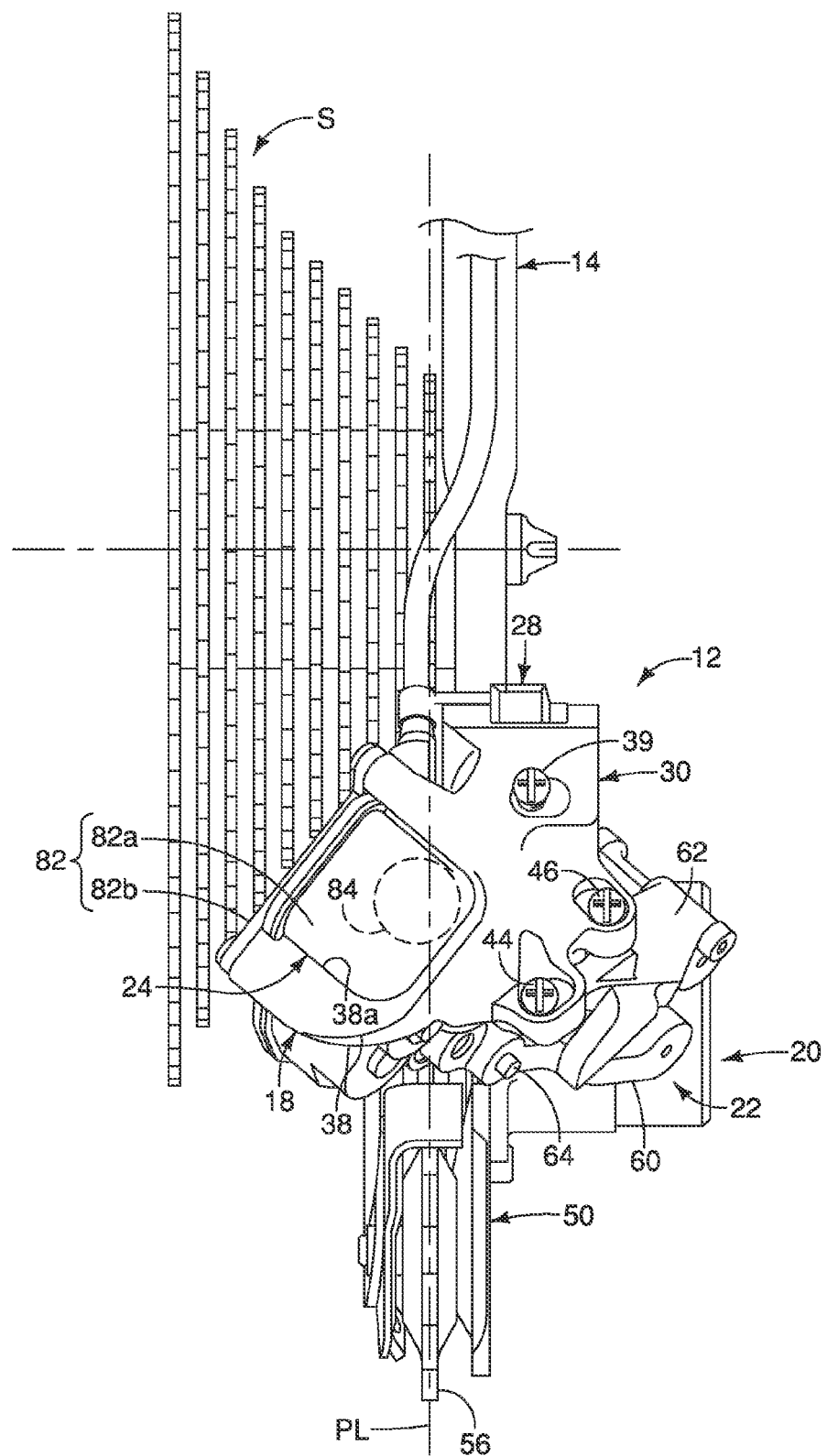
FIG. 2 is a rear end elevational view of the rear frame portion and the rear derailleur illustrated in FIG. 1 in the top shift stage position, but with the chain guide in the fully retracted position.
Figure 3:
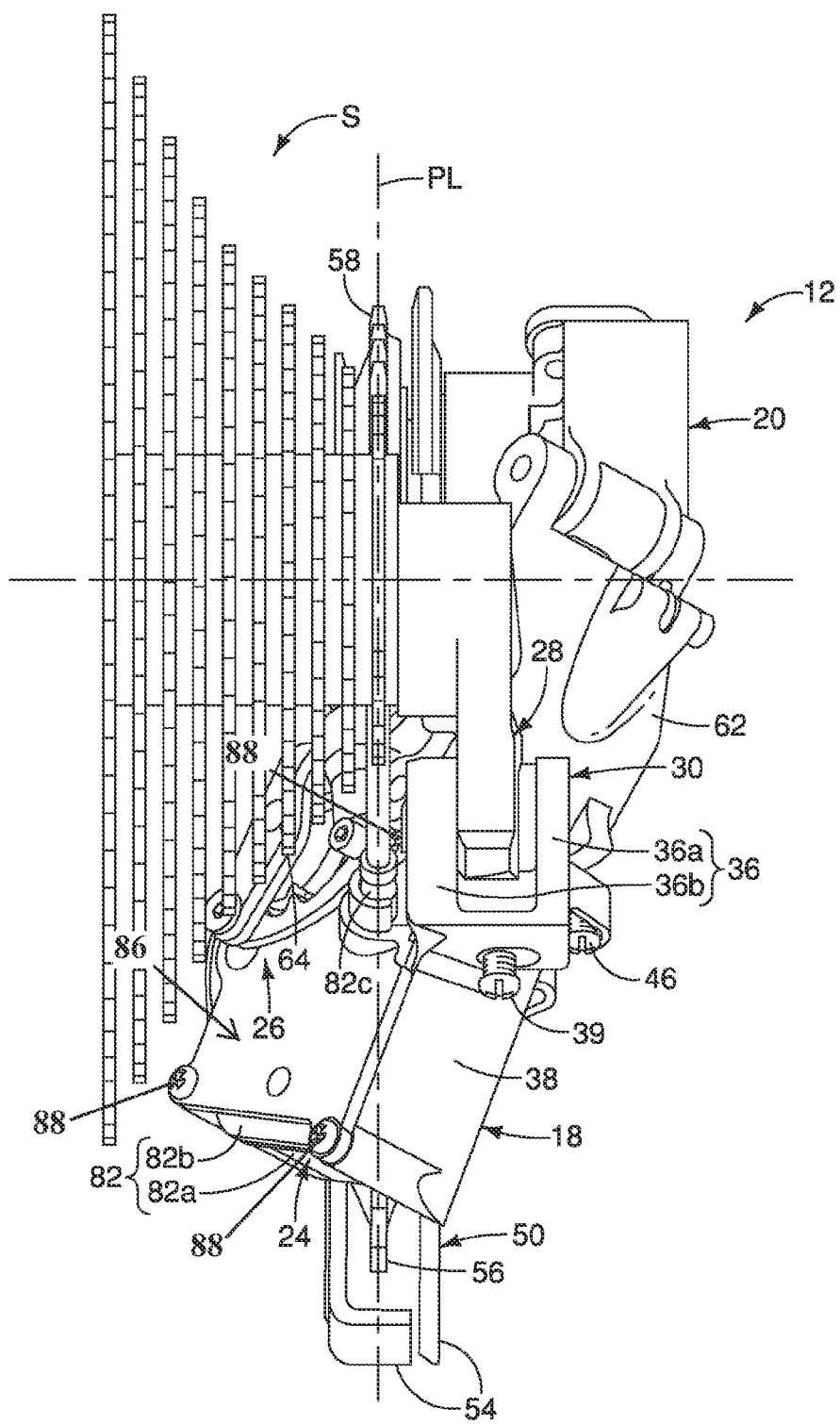
FIG. 3 is a top plan view of the rear frame portion and the rear derailleur illustrated in FIGS. 1 and 2 in the top shift stage position, with the chain guide in the fully retracted position.

Referring initially to FIGS. 1 to 3, a rear portion of a bicycle 10 is illustrated that includes, among other things, a bicycle rear derailleur 12 in accordance with an illustrated embodiment. The rear derailleur 12 is secured to a rear portion of a bicycle frame 14 in a conventional manner as discussed below. The rear derailleur 12 is operated by an electric rear shifter (not shown), which is a shift actuating device. The electric rear shifter operates the rear derailleur 12 between a plurality of shift stage (gear) positions such that a bicycle chain 16 is moved by the rear derailleur 12 in a lateral direction between a plurality of rear sprockets S. The rear derailleur 12 is illustrated in a top shift stage (gear) position in FIGS. 1 to 3. As used herein, the term "top shift stage (gear) position" refers to the rear derailleur 112 being in an operating position that corresponds to the chain 16 being guided onto the rear sprocket S with the smallest number of teeth. As used herein, the term "low shift stage (gear) position" refers to the rear derailleur 12 being in an operating that corresponds to the chain 16 being guided onto the rear sprocket S with the largest number of teeth.

The rear derailleur 12 basically includes a base member 18, a movable member 20, a linkage 22 and an electric motor unit 24. The electric motor unit 24 is operatively coupled to the linkage 22 to move the movable member 20 with respect to the base member 18. Thus, in the illustrated embodiment, the rear derailleur 12 constitutes an electric or motorized rear derailleur. As seen in FIGS. 3 to 7, the linkage 22 includes a saver structure 26 that operatively couples the electric motor unit 24 to the linkage 22 to provide protection for the electric motor unit 24 as discussed below.

In the illustrated embodiment, the base member 18 includes a first bracket member 28 and a second bracket member 30. The first and second bracket members 28 and 30 are preferably constructed of a hard rigid material such as a lightweight metal (e.g., an aluminum alloy). The first bracket member 28 constitutes an example of a first member of the base member 18, while the second bracket member 30 constitutes an example of a second member of the base member 18. The second bracket member 30 is coupled to the first bracket member 28 by a fastener 32 (e.g., a bolt). Preferably, the first member 28 and the second member 30 are pivotally coupled together by the fastener 32 about a pivot axis B that is defined by the center longitudinal axis of the fastener 32. The pivot axis B is sometimes called the B-axis of the rear derailleur.

The second bracket member 30 includes a linkage supporting portion 34, which is coupled to the linkage 22 as seen in FIG. 1. As explained below, the linkage 22 is pivotally coupled to the linkage supporting portion 34 of the second bracket member 30. The second bracket member 30 further includes a fixing portion 36 and an electric motor unit supporting portion 38. The fixing portion 36 has a pair of mounting flanges 36a and 36b for receiving the first bracket member 28 therebetween. The mounting flange 36a has a non-threaded bore 36c, while the mounting flange 36b has a threaded bore 36d. The fastener 32 extends through the non-threaded bore 36c and is threaded into the threaded bore 36d. The first member 28 is pivotally disposed on fastener 32. An adjustment structure 39 is disposed on the second bracket member 30. The adjustment structure 39 adjusts the pivot angle between the first bracket 28 and the second bracket 30. The adjustment structure 39 includes an adjust bolt and a threaded hole of the second bracket member 30. An axis of the adjust bolt extends and intersects a plane including the pivot axis B. The adjust bolt prevents a rotation of the second bracket 30 in counter clockwise direction in view of outside of the bicycle. The electric motor unit supporting portion 38 supports the electric motor unit 24. In particular, the electric motor unit supporting portion 38 has a recess 38a that receives the electric motor unit 24. In this way, the electric motor unit 24 is accommodated by the base member 18. The base member 18 covers at least outer side of the electric motor unit 24. In this embodiment, the base member 18 does not cover the rear side and the lower side of the electric motor unit 24 to reduce weight. The electric motor unit 24 is detachable to the electric motor unit supporting portion 38.

The first bracket member 28 includes a bicycle mounting portion 40 that defines a bolt receiving hole, which receives a fixing bolt 42 for attaching the rear derailleur 12 to the bicycle 10. The fixing bolt 42 is threaded into a threaded hole of a hanger portion of the bicycle frame 14. Thus, the base member 18 includes the bicycle mounting portion 40 for attaching the rear derailleur 12 to the bicycle 10. While the base member 18 is attached to the rear portion of a bicycle frame 14 using the first bracket member 28, it will be apparent from this disclosure that the second bracket member 30 can be attached directly to the rear portion of a bicycle frame 14 using the fixing bolt 42 or another fastener.

As seen in FIG. 1, the second bracket member 30 further includes a low shift stage adjustment screw 44 and a top shift stage adjustment screw 46 for setting range of movement of the movable member 20 with respect to the base member 18. In particular, the low shift stage adjustment screw 44 contacts an abutment of the linkage 22 when the movable member 20 is located in the low shift stage (gear) position or when the movable member 20 is located slightly over inside at the low shift stage (gear) position. The top shift stage adjustment screw 46 contacts an abutment of the linkage 22 when the movable member 20 is located in the top shift stage (gear)

position or when the movable member 20 is located slightly over outside at the top shift stage (gear) position as seen in FIG. 1.

Figure 4:
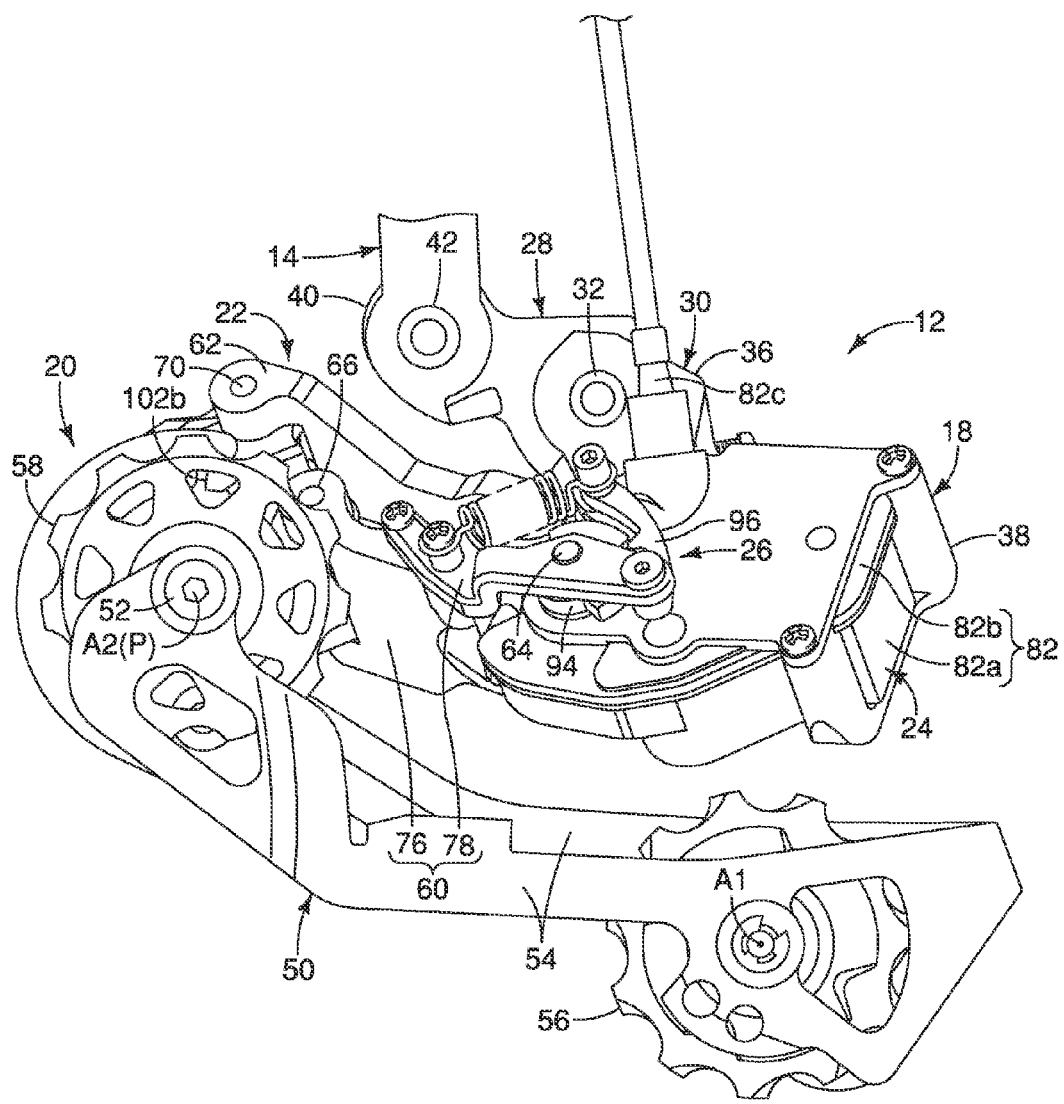
FIG. 4 is a frame side elevational view of the rear derailleur illustrated in FIGS. 1 to 3.

As seen in FIGS. 1 and 4, the movable member 20 is movably coupled to the base member 18 by the linkage 22. The movable member 20 includes a chain guide 50 that is pivotally coupled to the movable member 20 by an axle 52 to pivot about a chain guide pivot axis P, which is sometimes called the P-axis of the rear derailleur. In the illustrated embodiment, the axle 52 is preferably made of several pieces (not shown) to aid in the assembly of the movable member 20 and the attachment of the chain guide 50 to the movable member 20.

As best seen in FIGS. 1 to 4, the chain guide 50 basically includes a pair of chain cage plates 54, a tension pulley 56 and a guide pulley 58. The pulleys 56 and 58 are both rotatably disposed between the chain cage plates 54. In the illustrated embodiment, the guide pulley 58 is rotatably disposed on the axle 52, while the chain guide 50 is non-rotatably mounted to the axle 52.

The tension pulley 56 constitutes a first pulley, while the guide pulley 58 constitutes a second pulley. Alternatively, the guide pulley 58 constitutes a first pulley, while the tension pulley 56 constitutes a second pulley. The tension (first) pulley 56 rotates around a first pulley axis A1 in a center pulley plane PL that bisects the tension (first) pulley 56. The guide (second) pulley 58 rotates around a second pulley axis A2 in the center pulley plane PL that bisects the guide (second) pulley 58. Thus, in the illustrated embodiment, the pulleys 56 and 58 have the same center pulley plane PL. The center pulley plane in claims refers to the center pulley plane of the guide pulley 58. The center pulley plane PL bisects the center of the guide (second) pulley 56 in the direction of the axis A2 and is orthogonal to the axis A2.

Figure 5:
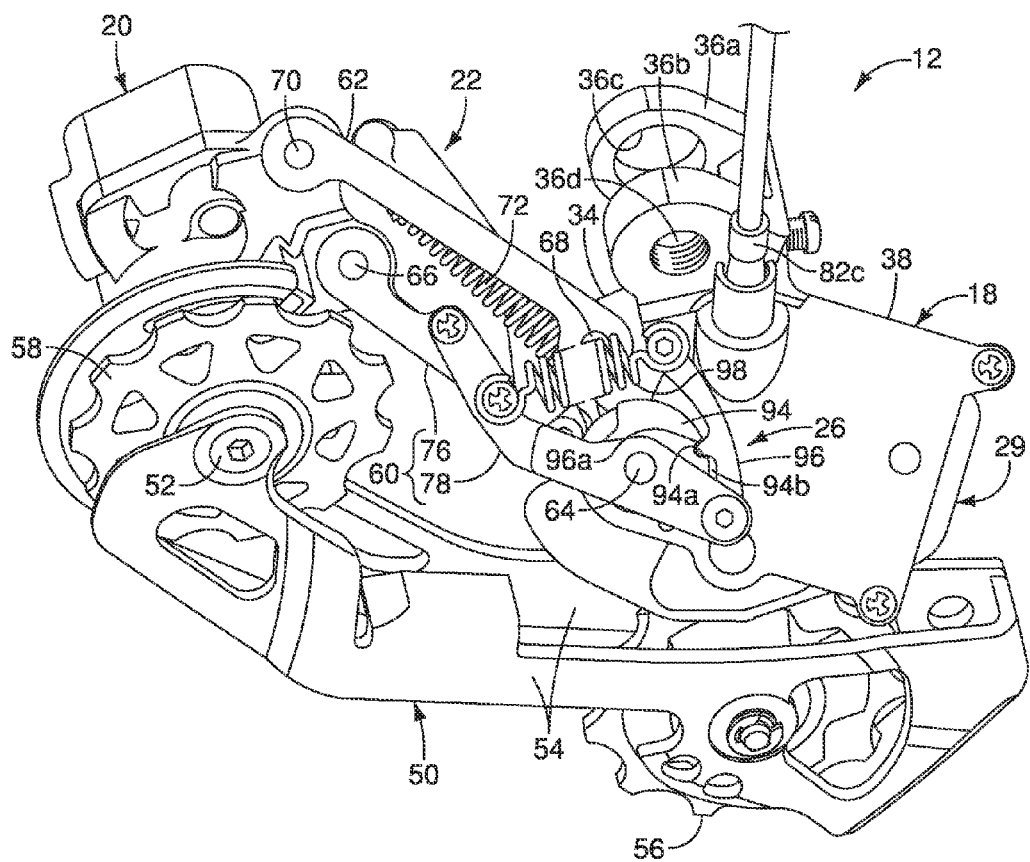
FIG. 5 is a frame side perspective view of the rear derailleur illustrated in FIGS. 1 to 4 with the saver mechanism in a drive transmitting position.

Referring now to FIGS. 1, 4 and 5, the linkage 22 will now be discussed in more detail. The linkage 22 movably supports the movable member 20 relative to the base member 18. In other words, the linkage 22 operatively connects the movable member 20 to the base member 18. The linkage 22 is at least partially disposed inward of the center pulley plane PL while the movable member 20 is disposed in the outermost lateral position, which corresponds to the top shift stage (gear) position of the rear derailleur 12.

In the illustrated embodiment, the linkage 22 includes a first link or inner link 60 that is pivotally connected to the base member 18 and the movable member 20. The linkage 22 further includes a second link or outer link 62 that is pivotally connected to the base member 18 and the movable member 20. The inner link 60 has a first end that is pivotally connected to the base member 18 by an output shaft 64 of the electric motor unit 24. The inner link 60 has a second end that is pivotally connected to the movable member 20 by a pivot pin 66. The outer link 62 has a first end that is pivotally connected to the base member 18 by a pivot pin 68. The outer link 62 has a second end that is pivotally connected to the movable member 20 by a pivot pin 70. Thus, the inner and outer links 60 and 62 have first ends pivotally connected to the base member 18 and second ends pivotally connected to the movable member 20 to define a four bar linkage arrangement. The pivot axis of the output shaft 64 of the electric motor unit 24 and the pivot axes of the pivot pins 66, 68 and 70 are slanted (inclined) relative to the pulley plane PL. In particular, the pivot axes of the output shaft 64 and the pivot pins 66, 68 and 70 are inclined in a downward direction as the output shaft 64 and the pivot pins 66, 68 and 70 extend outwardly away from a center vertical plane of the bicycle frame 14. Thus, the inner ends of the the output shaft 64 and the pivot pins 66, 68 and 70 are higher than the outer ends of the output shaft 64 and the pivot pins 66, 68 and 70.

As seen in FIG. 5, the linkage 22 further includes a biasing member 72 that is interposed between the inner and outer links 60 and 62 to bias the movable member 20 towards one of a low shift stage position and a top shift stage position. In the illustrated embodiment, the biasing member 72 is a coil tension spring that biases the movable member 20 towards the low shift stage position. With this arrangement, the biasing member 72 is stretched as the movable member 20 moves from the low shift stage position to the top shift stage position. In the low shift stage position, the biasing member 72 is preloaded (slightly stretched) to be stabilized in the low shift stage position. In the top shift stage position, the biasing member 72 is preloaded (slightly stretched) to be stabilized in the high shift stage position as seen in FIG. 1.

The biasing member 72 aids in taking up play or clearance between the gears of the electric motor unit 24 and other manufacturing tolerances in the manufacture of the rear derailleur 12. As a result, when the electric motor unit 24 is operated in a first rotational amount from a first position to a second position, and then the electric motor unit 24 is subsequently operated in a second rotational amount from the second position to the first position, the first and second rotational amounts may become slightly different position if the biasing member 72 is not provided to bias the movable member 20 in one direction. Thus, the biasing member 72 improves the stability of the shift positions of the rear derailleur 12.

In the illustrated embodiment, the inner link 60 includes a first linking member 76 and a second linking member 78, but the inner link 60 may be made by a single piece, if needed and/or desired. The second linking member 78 is fixedly attached to an intermediate portion of the first linking member 76 by the mounting element 74. The first linking member 76 forms the second end of the inner link 60, which is pivotally connected to the movable member 20 by a pivot pin 66. The first and second linking members 76 and 78 form the first end of the inner link 60, and each have an end portion that is pivotally connected to the base member 18 by an end of the output shaft 64 of the electric motor unit 24. Specifically, the first and second linking members 76 and 78 is not fixed to the output shaft 64, but rather the output shaft 64 can rotate relative to the end portions of the first and second linking members 76 and 78. When assembling the rear derailleur 12, it is easy to attach the inner link 60 to the output shaft 64 of the electric motor unit 24 as pivot shaft of the inner link 60 because the inner link 60 constructed by a plural parts.

Now the electric motor unit 24 will be discussed in more detail with reference primarily to FIGS. 2 to 4 and 8. The electric motor unit 24 is at least partially disposed inward of the center pulley plane PL while the movable member 20 is disposed in the outermost lateral position as seen in FIGS. 2 and 3. The electric motor unit 24 includes a motor housing 82 and a motor 84. The motor 84 is fixed inside the motor housing 82, which includes a casing portion 82a and a lid portion 82b. The motor 84 is a reversible electric motor. The electric motor unit 24 further includes a gear reduction unit 85, which is also disposed inside the motor housing 82. The output shaft 64 of the electric motor unit 24 is connected to an output shaft of the motor 84 by the gear reduction unit 85. Rotation of the output shaft 64 in one direction moves the movable member 20 and the chain guide 50 toward a low shift stage position with respect to the base member 18. Rotation of the output shaft 64 in the other direction moves the movable member 20 and the chain guide 50 toward atop shift stage position with respect to the base member 18.

The electric motor unit 24 further includes a motor unit mounting bracket 86 that is at least partially disposed inward of the center pulley plane PL while the movable member 20 is disposed in the outermost lateral position. The motor unit mounting bracket 86 is coupled to the base member 18 by three screws 88. The motor unit mounting bracket 86 retained the motor housing 82 in the recess 38a of the electric motor unit supporting portion 38 of the base member 18. Thus, the electric motor unit 24 is stationary with respect to at least a part of the base member 18, and is operatively coupled to the linkage 22 to move the movable member 20 relative to the base member 18 between an outermost lateral position (i.e., the top shift stage position in the illustrated embodiment) and an innermost lateral position i.e., the low shift stage position in the illustrated embodiment). The motor housing 82, the motor 84, and the gear reduction unit 85 are at least partially disposed inward of the center pulley plane PL while the movable member 20 is disposed in the outermost lateral position (i.e., the top shift stage position in the illustrated embodiment) as seen in FIG. 2.

The electric motor unit 24 includes the output shaft 64 that is at least partially disposed inward of the center pulley plane PL while the movable member 20 is disposed in the outermost lateral position as seen in FIG. 3. The output shaft 64 is connected to the inner link 60 to drive the linkage 22 for moving the movable member 20 in a lateral direction in response to rotation of the output shaft 64 by the motor 84. In this embodiment, the center pulley plane PL intersects the output shaft 64. The output shaft 64 of the electric motor unit 24 is rotatably mounted to the motor housing 82 to project out of opposite ends of the motor housing 82 to pivotally support the inner link 60 on the base member 18. The output shaft 64 of the electric motor unit 24 drives the inner link 60 to move the movable member 20 with respect to the base member 18. The outer link 62 moves in response to movement of the inner link 60. The output shaft 64 of the electric motor unit 24 is normally connected the inner link 60 by the saver structure 26 as discussed below.

As seen in FIG. 3, the lid portion 82b of the electric motor unit 24 includes an electric wire receptor 82c that is at least partially disposed inward of the center pulley plane PL while the movable member 20 is disposed in the outermost lateral position. The electric wire receptor 82c receives an electric wire W of the motor 84. The electric wire W of the motor 84 is electrically connected to a remote power source that is supplied to the motor 84 for operating the motor 84.

Now the saver structure 26 will be discussed in more detail with reference to FIGS. 3 to 7. The saver structure 26 is at least partially disposed inward of the center pulley plane PL while the movable member 20 is disposed in the outermost lateral position as seen in FIG. 3. The saver structure 26 includes an output member 94, a drive link 96 and a biasing element 98. The saver structure is movably arranged between a drive transmitting position that connects a drive force of the electric motor unit 24 to the first or inner link 60 and a non-drive transmitting position that disconnect the drive force of the electric motor unit 24 from the first or inner link 60.

The saver structure 26 basically performs two functions. First, the saver structure 26 normally transmits a drive force of the motor 84 to the inner link 60 for moving the movable member 20 with respect to the base member 18. Second, the saver structure 26 stops the transmission of a drive force of the motor 84 to the inner link 60 such that the motor unit 84 can continue to operate even though the movable member 20 will not move with respect to the base member 18 (e.g. becomes jammed), or the force to move the movable member 20 with respect to the base member 18 becomes greater than a prescribed operating force. In this way, the motor unit 84 is protected by the saver structure 26 in certain situations.

As seen in FIGS. 4 to 7, the output member 94 is movably operated by the motor 84 of the electric motor unit 24. In particular, the output member 94 is fixed on the output shaft 64 of the electric motor unit 24 to rotate with the output shaft 64. For example, the output member 94 is fixed to the output shaft 64 of the electric motor unit 24 by a spline connection as illustrated. In this way, the output member 94 is turned as the output shaft 64 of the electric motor unit 24 is turned by the operation of the motor 84. The movement force (i.e., torque) of the output member 94 is transmitted by the drive link 96 to the first linking member 76 the inner link 60. More specifically, the drive link 96 is pivotally mounted on the inner link 60 to move between a drive transmitting position that connects a drive force of the motor 84 to the inner link 60 and a non-drive transmitting position that disconnect the drive force of the motor 84 from the inner link 60. The biasing element 98 applies a biasing force on the drive link 96 to bias the drive link 96 into contact with the output member 94. The drive link 96 engages the output member 94 to move together while the drive link 96 is in the drive transmitting position. On the other hand, the drive link 96 disengages from the output member 94 to provide relative movement between the drive link 96 and the output member 94 while the drive link 96 is in the non-drive transmitting position. The drive link 96 moves from the drive transmitting position to the non-drive transmitting position upon a prescribed resistance occurring in the inner link 60, which overcomes the biasing force of the biasing element 98 on the drive link 96.

As seen in FIGS. 4 to 7, the biasing element 98 applies a biasing force on the drive link 96 to bias the drive link 96 into engagement with the output member 94. Thus, the output shaft 64 of the electric motor unit 24 is linked to the inner link 60 by the output member 94 and the drive link 96 as a result of the biasing element 98 such that the drive force of the motor 84 is transmitted to the inner link 60 for moving the movable member 20 with respect to the base member 18. The biasing element 98 applies a biasing force on the drive link 96 into engagement with the output member 94 to maintain the drive link 96 in the drive transmitting position. Thus, this arrangement of the output member 94, the drive link 96 and the biasing element 98 for provides an overridable connection between the output shaft 64 of the electric motor unit 24 and the inner link 60 in which the connection between the output shaft 64 of the electric motor unit 24 and the inner link 60 is switched from the drive transmitting position to the non-drive transmitting position upon the force required to move the movable member 20 with respect to the base member 18 becoming greater than a prescribed operating force. In the illustrated embodiment, the biasing element 98 is a coil spring.

In the illustrated embodiment, the overridable connection between the output shaft 64 of the electric motor unit 24 and the inner link 60 is established by providing one of the output engagement portion 96a and the output member 94 with a notch and the other of the output engagement portion 96a and the output member 94 with a protrusion that mates with the notch to establish the drive transmitting position. For example, as illustrated, the output member 94 includes a notch 94a and the output engagement portion 96a is a protrusion that mates with the notch 94a to establish the drive transmitting position.

Figure 6:
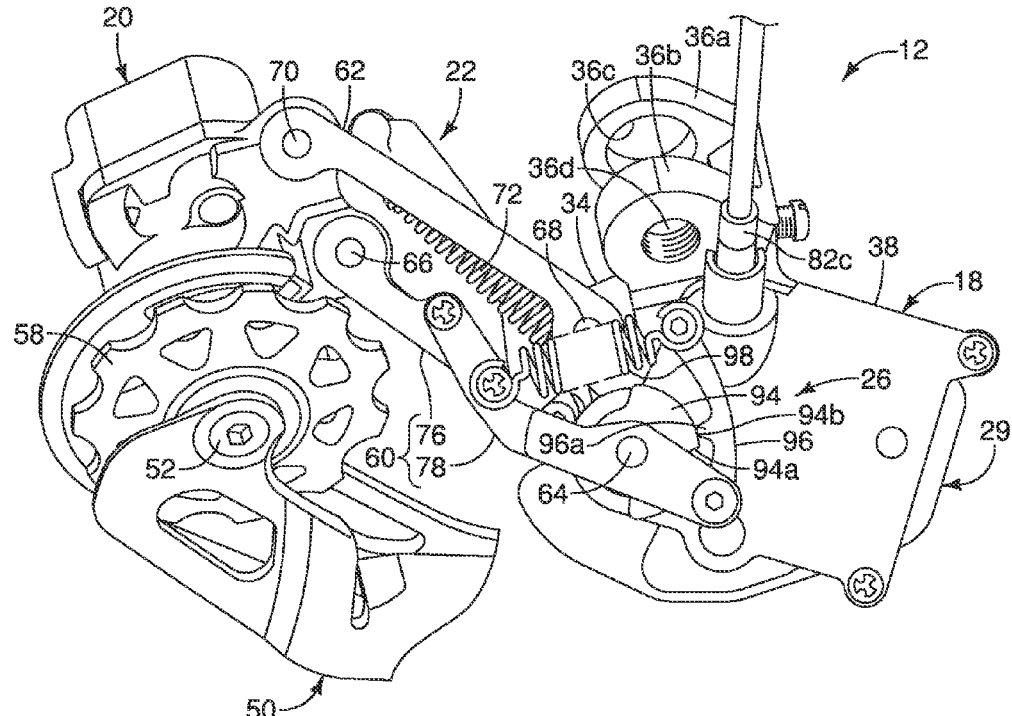
FIG. 6 is a frame side perspective view of the rear derailleur illustrated in FIGS. 1 to 5 with the saver mechanism in a first non-drive transmitting position.
Figure 7:
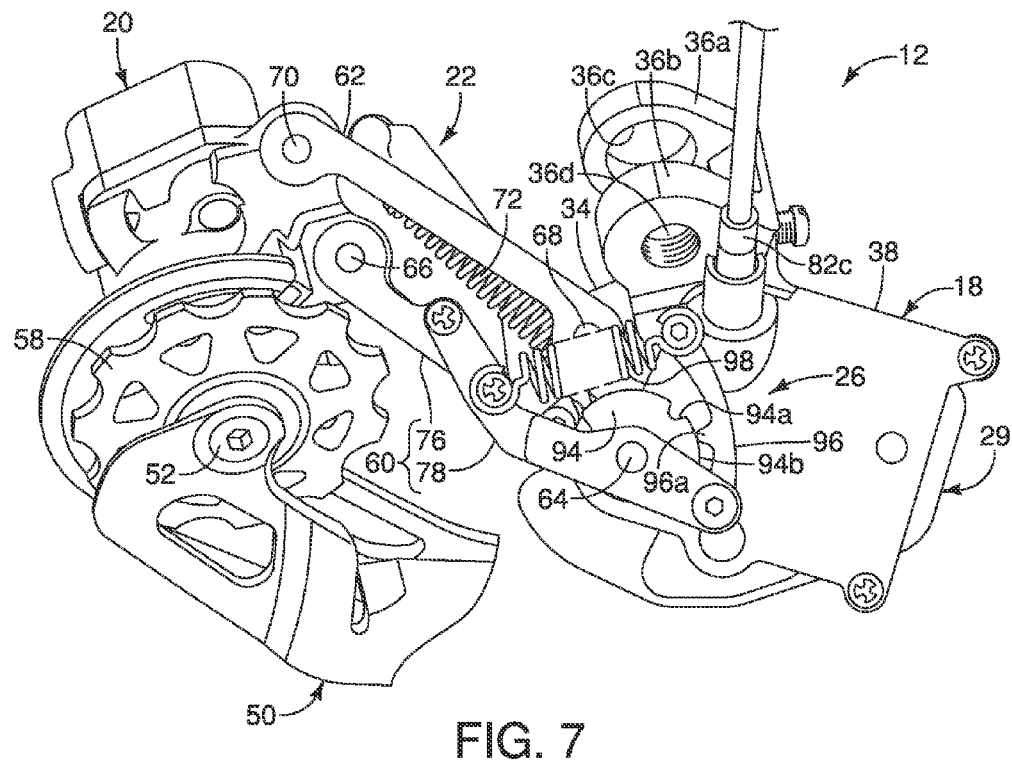
FIG. 7 is a frame side perspective view of the rear derailleur illustrated in FIGS. 1 to 6 with the saver mechanism in a second non-drive transmitting position.
Figure 8:
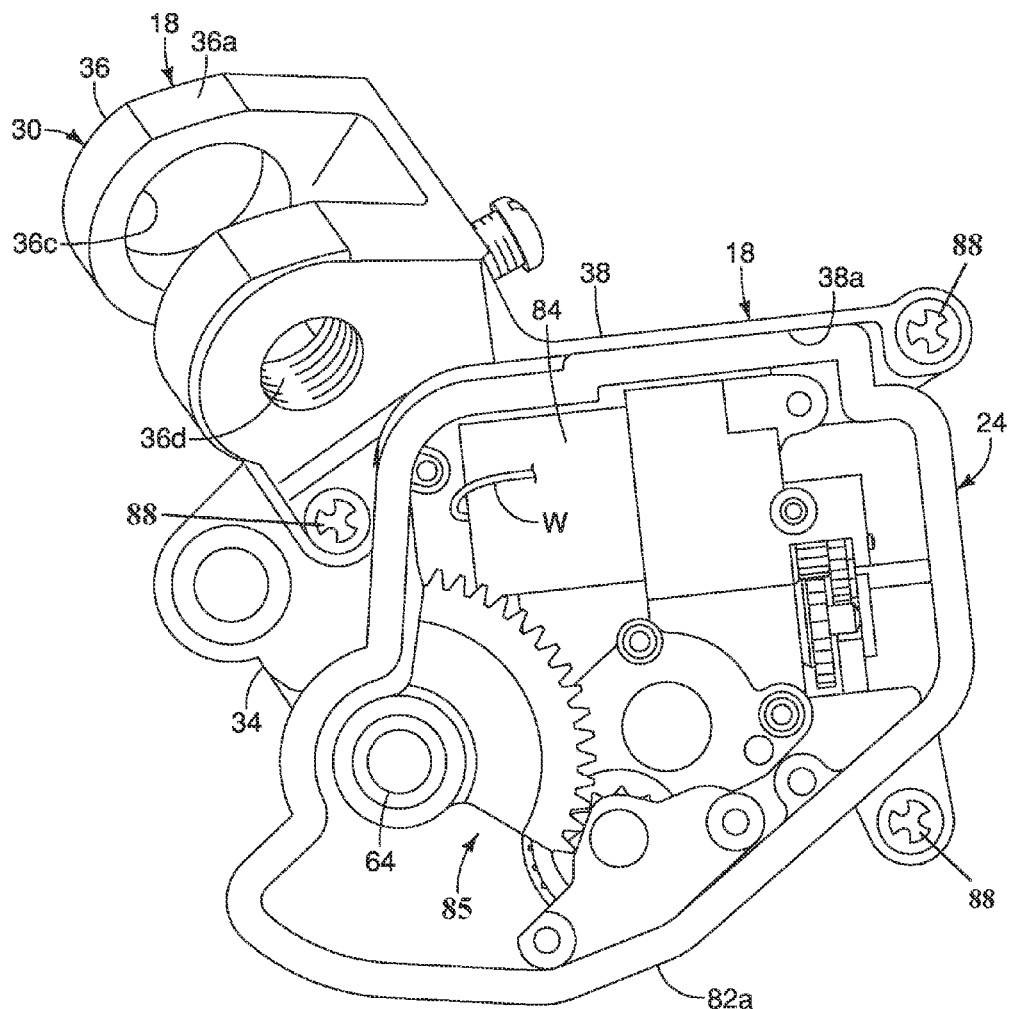
FIG. 8 is a frame side elevational view of the base member of the rear derailleur illustrated in FIGS. 1 to 7 with the cover of the motor housing removed to illustrate the internal structure of the electric motor unit.

FIGS. 6 and 7 illustrate situations in which the movable member 20 will not move with respect to the base member 18

(e.g. becomes jammed), or for some reason the force to move the movable member 20 with respect to the base member 18 becomes greater than a prescribed operating force, which is determined by the biasing force of the biasing element 98. If the movable member 20 becomes stuck, and the output shaft 64 of the electric motor unit 24 is driven by the motor 84, the saver structure 26 will permit the output shaft 64 of the electric motor unit 24 to rotate. In particular, the output member 94 will act as a cam that moves the drive link 96 against the biasing force of the biasing element 98. This movement of the drive link 96 by the output member 94 against the biasing force of the biasing element 98 results in the output engagement portion 96a (e.g., protrusion) of the drive link 96 being forced out of the notch 94a of the output member 94 and onto a cam surface 94b of the output member 94. Once the output engagement portion 96a is resting on the cam surface 94b, the output shaft 64 of the electric motor unit 24 can rotate without transmitting the drive force to the inner link 60. The cam surface 94b of the output member 94 extends in both circumferential directions from the notch 94a of the output member 94. In this way, the motor 84 is protected in both operating directions.

While not shown, the electric motor unit 24 can be provided with a shift stage position sensor such as a digital position sensor that is mounted on the gear reduction unit 85 to detect movement of one of the parts of the gear reduction unit 85. More particularly, the shift stage position sensor can be formed by a position sensor shutter wheel and a dual channel photo interrupter having a light source or LED that is disposed on one side of the shutter wheel and a phototransistor (e.g., a light detector) disposed on the other side of the shutter wheel. The shift stage position sensor can be formed by a magnetoresistor sensor and a magnet. The magnet is deposed on a part of the reduction gear.

Figure 9:
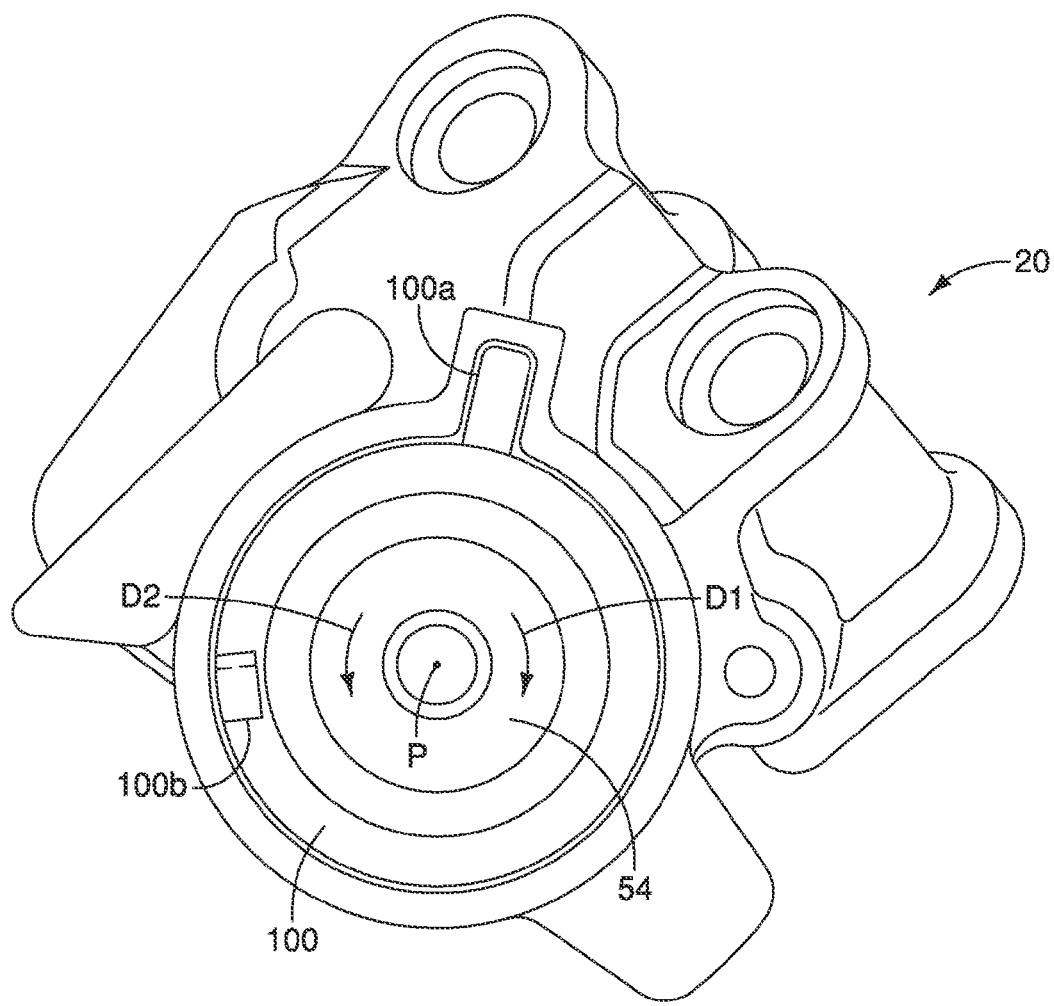
FIG. 9 is a frame side elevational view of the movable member of the rear derailleur illustrated in FIGS. 1 to 7.

As seen in FIG. 9, the movable member 20 is provided with a biasing element 100. The biasing element 100 is provided between the movable member 20 and the chain guide 50 to bias the chain guide 50 around the chain guide pivot axis P in a first rotational direction D1 (see FIGS. 9 and 10). Thus, the first rotational direction D1 is a clockwise rotational direction of the chain guide 50 around the chain guide pivot axis P while being viewed along the chain guide pivot axis P from the non-frame facing side of the movable member 20. In this illustrated embodiment, the biasing element 60 is a torsion spring having a coiled portion disposed around the axle 52, a first spring end 100a engaged with the movable member 20 and a second spring end 100b that is engaged with (i.e., hooked on) the chain guide 50.

Figure 10:
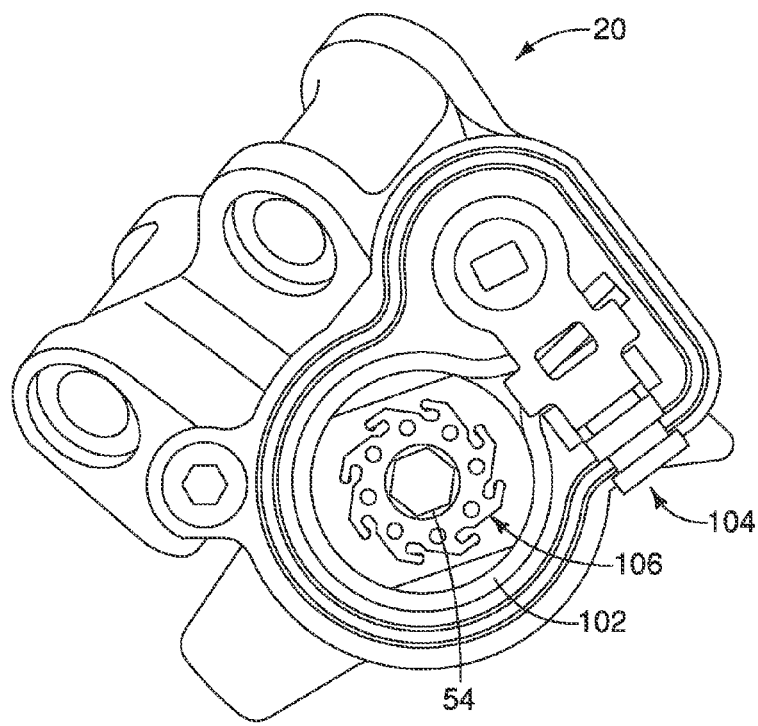
FIG. 10 is a non-frame side elevational view of the movable member of the rear derailleur illustrated in FIGS. 1 to 7 with a cover member of the movable member removed to illustrate the friction element, the friction adjusting mechanism and the one-way clutch of the movable member.
Figure 11:
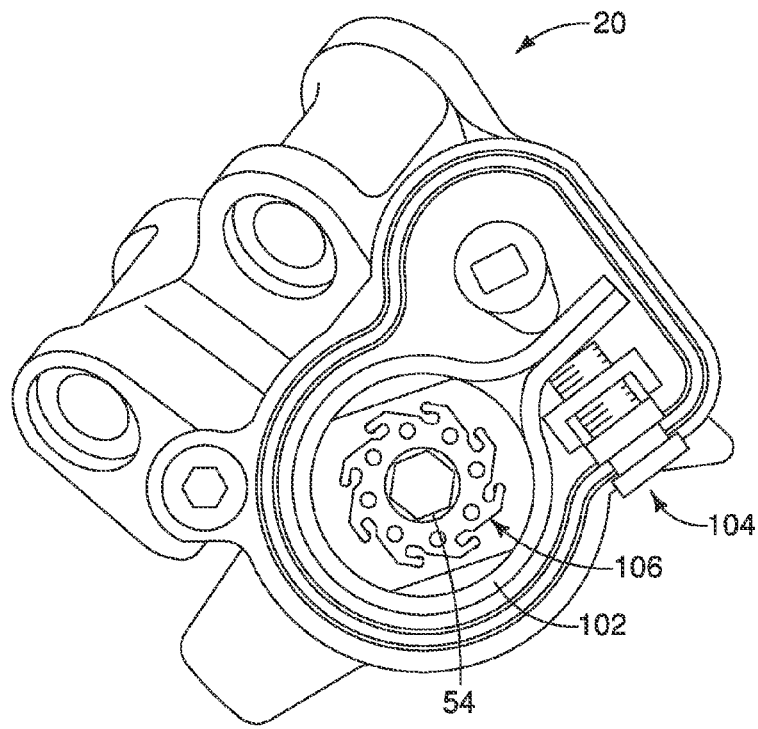
FIG. 11 is another non-frame side elevational view of the movable member of the rear derailleur illustrated in FIGS. 1 to 7 with the cover member of the movable member removed and a part of the friction adjusting mechanism removed.

As seen in FIGS. 10 and 11, in the illustrated embodiment, the movable member 20 is provided with a friction element 102 that is operatively arranged between the movable member 20 and the chain guide 50. The friction element 102 frictionally provides rotational resistance in a second rotational direction D2 of the chain guide 50 about the chain guide pivot axis P. Preferably, the friction element 102 is adjustable to vary the rotational resistance provided by the friction element 102 by a friction adjusting mechanism 104. Basically, the friction element 102 increases an operation energy of the electric motor unit 24 as the electric motor unit 24 moves the movable member 20 toward the low shift stage position with respect to the base member 18. The friction element 102 constitutes a resistance applying element. In this illustrated embodiment, a one-way clutch 106 is disposed between the friction element 102 and the axle 52. The friction element 102 applies resistance to the rotational movement of the chain guide 50 in the second rotational direction D2 with respect to the movable member 20. In particular, the friction element 102 applies frictional resistance to rotational movement of the chain guide 50 by applying frictional resistance to the rotation of one-way clutch 56. Since resistance applying elements and one-way clutches similar to the friction element 102 and the one-way clutch 104 are discussed in detail in U.S. Patent Application Publication No 2012/0083371, the friction element 102 and the one-way clutch 106 will not be discussed in further detail herein.

The term "connect" or "connected", as used herein, encompasses configurations in which an element is directly secured to another element by affixing the element directly to the other element; configurations in which the element is indirectly secured to the other element by affixing the element to intermediate member(s) which in turn are affixed to the other element; and configurations in which one element is integral with another element, i.e. one element is unitary part of the other element. For example, the magnetized part can be directly secured to the crank arm attachment part, or can be indirectly secured to the crank arm attachment part through intermediate member(s), or can be integral with the crank arm attachment part. This definition also applies to words of similar meaning, for example, the terms "attach", "attached", "join", "joined", "fix", "fixed", "bond", "bonded", "couple", "coupled" and their derivatives.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired so long as they do not substantially their intended function. Components that are shown directly connected or contacting each other can have intermediate structures disposed between them unless specifically stated otherwise. The functions of one element can be performed by two, and vice versa unless specifically stated otherwise. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the foregoing descriptions of the embodiments according to the present invention are provided for illustration only, and not for the purpose of limiting the invention as defined by the appended claims and their equivalents.

What is claimed is:
1. A rear derailleur comprising:
    abuse member including a bicycle mounting portion for attaching to a bicycle;
    a movable member including a chain guide having a first pulley that rotates around a first pulley axis in a center pulley plane that bisects the first pulley;
    a linkage movably supporting the movable member relative to the base member; and
    an electric motor unit being stationary with respect to at least a part of the base member during movement of the movable member relative to the base member and operatively coupled to the linkage to move the movable member relative to the base member between an outermost lateral position and an innermost lateral position,
    the electric motor unit being at least partially disposed inward of the center pulley plane while the movable member is disposed in the outermost lateral position.

2. The rear derailleur according to claim 1, wherein the electric motor unit includes an output shaft that is at least partially disposed inward of the center pulley plane while the movable member is disposed in the outermost lateral position.

3. The rear derailleur according to claim 2, wherein the linkage includes an inner link pivotally connected to the base member and the movable member, the output shaft being connected to the inner link.

4. The rear derailleur according to claim 1, wherein the electric motor unit includes an electric wire receptor that is at least partially disposed inward of the center pulley plane while the movable member is disposed in the outermost lateral position.

5. The rear derailleur according to claim 1, wherein the electric motor unit includes a motor unit mounting bracket that is at least partially disposed inward of the center pulley plane while the movable member is disposed in the outermost lateral position.

6. The rear derailleur according to claim 5, wherein the motor unit mounting bracket is coupled to the base member.

7. The rear derailleur according to claim 1, wherein the electric motor unit includes a motor that is at least partially disposed inward of the center pulley plane while the movable member is disposed in the outermost lateral position.

8. The rear derailleur according to claim 1, wherein the linkage includes a saver structure that is at least partially disposed inward of the center pulley plane while the movable member is disposed in the outermost lateral position.

9. The rear derailleur according to claim 8, wherein the linkage includes a first link pivotally connected to the base member and the movable member, and the saver structure being movably arranged between a drive transmitting position that connects a drive force of the motor unit to the first link and a non-drive transmitting position that disconnect the drive force of the motor unit from the first link.

10. The rear derailleur according to claim 1, wherein the base member includes a first member and a second member coupled to the first member,
the first member including the bicycle mounting portion, and
the second member including a linkage supporting portion which is coupled to the linkage.

11. The rear derailleur according to claim 10, wherein the first member and the second member are pivotally coupled together.

12. The rear derailleur according to claim 1, wherein the motor unit is accommodated by the base member.

13. A rear derailleur comprising:
a base member including a bicycle mounting portion for attaching to a bicycle;
a movable member including a chain guide having a first pulley that rotates around a first pulley axis in a center pulley lane that bisects the first pulley;
a linkage movably supporting the movable member relative to the base member, the linkage being at least partially disposed inward of the center pulley plane while the movable member is disposed in the outermost lateral position; and
an electric motor unit being stationary with respect to at least a part of the base member and operatively coupled to the linkage to move the movable member relative to the base member between an outermost lateral position and an innermost lateral position,
the electric motor unit being at least partially disposed inward of the center pulley plane while the movable member is disposed in the outermost lateral position.

* * * * *